3,320,261
PYRIDYL AND QUINOLYL MERCAPTO METHYL PHOSPHORUS ESTERS

Walter Lorenz, Wuppertal-Vohwinkel, Germany, assignor to Farbenfabriken Bayer Aktiengesellschaft, Leverkusen, Germany, a German corporation
No Drawing. Filed Aug. 10, 1964, Ser. No. 388,688
Claims priority, application Germany, Aug. 8, 1963,
F 40,454
6 Claims. (Cl. 260—283)

The present invention relates to and has as its objects new and useful, insecticidally active phosphorus-containing compounds.

More specifically the invention relates to thiol- or thiono-thiol-phosphoric and -phosphonic acid esters of the general formula

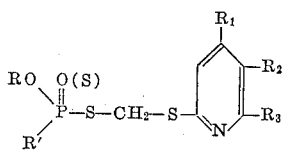

as well as to a process for the production of these compounds.

In the above formula:

R and R' stand for the same or different lower alkyl groups
R' can also represent a radical RO
$R_2$ and $R_3$ denote hydrogen atoms or jointly stand for a fused benzene ring, while
$R_1$ is a hydrogen atom or, if $R_2$ and $R_3$ are members of a fused benzene ring, represents a methyl group.

In accordance with the present invention it has been found that compounds of the above constitution are obtained in a smooth and uniform reaction if dialkyl-thiol- or -thiono-thiol-phosphoric (-phosphonic) acid-S-halomethyl esters of the formula

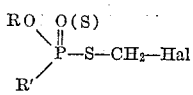

are reacted with 2-mercapto-pyridines or -quinolines of the general structure

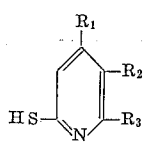

the symbols R, R', $R_1$, $R_2$ and $R_3$ in the aforesaid formula having the meaning stated above, while Hal stands for a halogen atom, preferably a chlorine or bromine atom.

The course of the process according to the invention may be illustrated by means of the following reaction scheme:

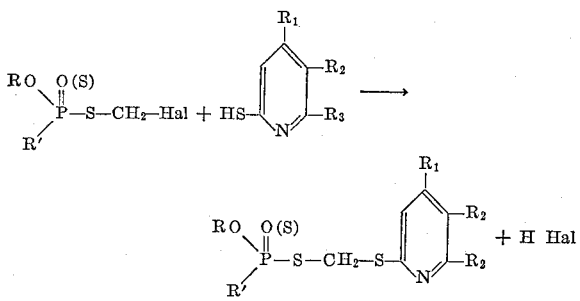

In the above equation the radicals R, R', $R_1$, $R_2$, $R_3$ and Hal have the meaning given above.

The reaction according to the invention is preferably carried out in the presence of an inert organic solvent or diluent and in the presence of an acid acceptor. Suitable solvents are especially lower aliphatic alcohols or ketones, e.g. methanol, ethanol, acetone, methyl ethyl, methyl isopropyl or methyl isobutyl ketone and also dimethyl formamide, while alkali metal alcoholates and carbonates, for example sodium methylate or ethylate and potassium carbonate have chiefly proved to be satisfactory acid-binding agents. Instead of working in the presence of acid-binding agents, it is, however, just as possible to start from the salts, preferably the alkali metal salts, of the above-mentioned 2-mercapto-pyridines or -quinolines and to react these in the sense of the present invention with the dialkylthiol- or thionothiol-phosphoric (-phosphonic) acid-S-halomethyl esters.

To attain especially good yields and pure products, the reaction according to the invention is carried out at room temperature or at a slightly to moderately elevated temperature (20 to 80° C.) and, after combining the starting components, stirring of the reaction mixture is continued for some time (1 to 3 hours or overnight) with heating to the stated temperature. Moreover, the addition of catalytic amounts of alkali metal iodide frequently proves to be advantageous for accelerating the course of the reaction.

The starting materials required for the process according to the invention are known from the literature. Thus, for example, the dialkyl-thionothiol-phosphoric (-phosphonic) acid-S-chloromethyl esters can be prepared according to the instructions of German patent specifications Nos. 1,015,794 and 1,099,531 from dialkyl-thionothiol-phosphoric (-phosphonic) acid salts by reaction with chlorobromomethane. The required 2-mercapto-pyridine is easily obtainable according to Phillips and Shapiro (Journal of the Chemical Society, 1942, page 584) by hydrolysis of the corresponding thiuronium bromide; a method for the production of 2-mercapto-quinolines has been described by E. Rosenhauer, H. Hoffmann and W. Heuser in "Berichte der Deutschen Chemischen Gesellschaft," volume 62 (1929), page 2730.

The thiol- or thionothiol-phosphoric (-phosphonic) acid esters are usually obtained in the form of colourless to pale yellow oils, some of which can be distilled under strongly reduced pressure. Some, however, may be obtained as solid crystalline substances with a sharp melting point and these can easily be further purified by recrystallisation from the customary solvents.

The products of the process are distinguished by an outstanding insecticidal activity, especially against aphids, spider mites and ectoparasites, e.g. ticks; in this respect they are clearly superior to the known compounds of analogous constitution which have been proposed for the same purpose. Thus, for example, spider mites are completely destroyed by 0.001% solutions, ticks even by 0.00005% solutions of the O,O-diethyl-thionothiol-phosphoric acid-S-[pyridyl-(2)-mercapto-methyl]ester according to the invention, and aphids can still be destroyed to 40% even by 0.0001% solutions of the same compound.

Furthermore the new compounds of the present invention very effectively kill bugs, mosquitoes, cockroaches, caterpillars, flies etc. They distinguish themselves especially by a good contact-insecticidal activity and mostly also by a systemic action. At the same time they have an activity on eating insects such as caterpillars. Most surprisingly they are of remarkably low toxicity against mammals.

On account of the outstanding insecticidal properties, the inventive products are used as pest control agents, especially in plant protection and in the veterinary field. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

The following examples are given for the purpose of illustrating the invention as claimed:

EXAMPLE 1

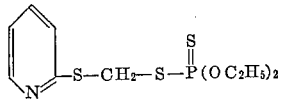

49 g. (0.44 mol) of 2-mercapto-pyridine (M.P. 125° C.) are suspended in 200 cc. of methanol and dissolved by the addition of an amount of sodium methylate corresponding to 0.44 mol of sodium. After the addition of 5 g. of sodium iodide, the mixture is treated dropwise with 94 g. (0.4 mol) of O,O-diethyl-thionothiol-phosphoric acid-S-chloromethyl ester and subsequently stirred at room temperature overnight. Noticeable amounts of sodium chloride have separated already on the next morning. To complete the reaction, the mixture is further heated at 60° C. for 1 hour, poured, after cooling, into 1 litre of water, and the precipitated oil is taken up in petroleum ether. The phases are separated and the aqueous-methanolic solution is again shaken out with petroleum ether. The combined petroleum ether solutions are washed with water and shaken once with 40 cc. of a 2 N sodium hydroxide solution. Finally, the organic layer is washed with water until the reaction is neutral, dried over sodium sulphate and distilled. After evaporation of the solvent and after a small amount of first runnings, the O,O-diethyl-thionothiol-phosphoric acid-S-[pyridyl - (2) - mercapto - methyl] ester distils over at 124° C. under a pressure of 0.01 mm. Hg, in the form of a pale yellow oil, practically without a residue. The yield amounts to 98 g. (79% of the theory).

*Analysis.*—Calculated for $C_{10}H_1O_2NS_3P$ (molecular weight 309.4): N, 4.54%; S, 31.08 %; P, 10.01%. Found: N, 4.54%; S, 30.88%; P, 10.07%.

EXAMPLE 2

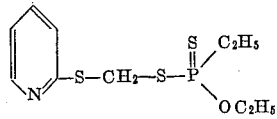

49 g. (0.44 mol) of 2-mercapto-pyridine (M.P. 125° C.) are suspended in 140 cc. of methanol and the undissolved components are dissolved by the addition of an amount of sodium methylate corresponding to 0.44 mol of sodium. The mixture is subsequently treated dropwise, starting at 20° C., with 88 g. (0.4 mol) of ethyl thionothiol - phosphonic acid - O - ethyl-S-chloromethyl ester. The temperature of the reaction mixture rises to 27 to 28° C. in the course of one hour. The reaction mixture is then heated at 50 to 60° C. for a further 2 hours, cooled, the sodium chloride formed is removed by filtration and the filtrate poured into water. The separated oil is taken up in ether, the ethereal solution shaken first with water, then once with a 2 N sodium hydroxide solution, and finally washed again with water until the reaction is neutral. After drying the organic phase over sodium sulphate the solvent is distilled off and the residue fractionated. The ethyl-thionothiol-phosphonic acid-O-ethyl-S-(pyridyl-(2)-mercapto-methyl] ester distils over at 120° C. under a pressure of 0.01 mm. Hg in the form of a pale yellow oil. The yield amounts to 105 g. (89.4% of the theory).

*Analysis.*—Calculated for $C_{10}H_{16}ONS_3P$ (molecular weight 293.4): N, 4.77%; S, 32.79%; P, 10.56%. Found: N, 4.75%; S, 32.68%; P, 10.43%.

The mean toxicity ($DL_{50}$) of the compound on rats per os is 5 mg. per kg. of animal weight.

EXAMPLE 3

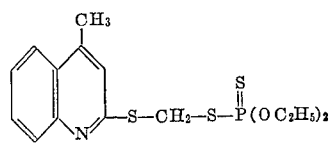

38 g. (0.22 mol) of the potassium salt of 2-mercapto-4-methyl-quinoline (prepared from S-2-lepidyl-thiuronium chloride and potassium hydroxide in an aqueous alcoholic solution) are finely powdered and suspended in 150 cc. of acetone. 35.5 g. (0.15 mol) of O,O-diethyl-thionothiol-phosphoric acid-S-chloromethyl ester are added dropwise to this solution, starting at 20° C. The internal temperature of the mixture rises to about 30° C. in the course of one hour. The reaction mixture is subsequently stirred at room temperature overnight, the potassium chloride formed is filtered off with suction and the filtrate poured into water. The separated oil solidifies after a short time in crystalline form. The crystalline mass is filtered off with suction, washed with water and recrystallised from ligroin (solubility 1 g./20 cc.) The O,O-diethyl-thionothiol-phosphoric acid-S-[4-methyl-quinolyl-(2)-mercapto-methyl] ester is obtained in the form of pale yellow, almost colourless needles of M.P. 105 to 106° C. The yield amounts to 12 g. (21.5% of the theory).

*Analysis.*—Calculated for $C_{15}H_{20}O_2NS_3P$ (molecular weight 373.5): N, 3.75%; S, 25.70%; P, 8.29%. Found: N, 3.71%; S, 25.62%; P, 8.42%.

When 1000 mg. of this compound per kg. of animal weight are administered to rats per os, only symptoms occur, but no deaths.

EXAMPLE 4

As examples for the special utility the inventive compounds of the following formulae

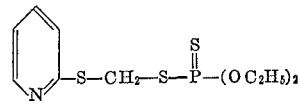

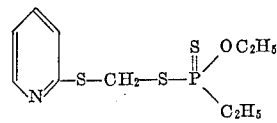

have been tested against aphids (contact insecticidal action), spider mites, caterpillars, flies and oat aphids (systemic action).

Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicating in the following paragraphs:

(a) Against aphids (contact-insecticidal action) of the species *Doralis fabae:* heavily infested bean plants (*Vicia faba*) have been sprayed drip wet with solutions as prepared above. The effect has been determined after 24 hours by counting the dead pests either on the surface of the soil or still remaining on the plants.

The following results have been obtained:

| Compound | Aqueous concentration (in percent active ingredient/water) | Killing rate (in percent) |
|---|---|---|
| (I) | 0.001 | 100 |
| (II) | 0.0001 | 40 |
| | 0.01 | 100 |

(b) Against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 8 days. The following results have been obtained:

| Compound | Aqueous concentration (in percent active ingredient/water) | Killing rate (in percent) |
|---|---|---|
| (I) | 0.001 | ¹ 100 |
| (II) | 0.001 | ¹ 100 |

¹ Ovicidal action.

(c) Against caterpillars of the type diamond black moth (*Plutella maculipennis*): white cabbage has been sprayed drip wet with aqueous emulsions as prepared above in a concentration as shown below. Caterpillars (10 each) have been placed on the sprayed leaves of the white cabbage. The living status has been determined after 24 and 48 hours. The following results have been obtained:

| Compound | Aqueous concentration (in percent active ingredient/water) | Killing rate (in percent) |
|---|---|---|
| (I) | 0.1 | 100 |
| (II) | 0.01 | 70 |
| | 0.01 | 100 |

(d) Against flies: about 50 flies (*Musca domestica*) are placed under covered petri dishes in which drip wet filter papers have been placed which are sprayed with insecticidal solutions of concentrations as shown below. The living status of the flies has been determined after 24 hours. The following results have been obtained:

| Compound | Aqueous concentration (in percent active ingredient/water) | Killing rate (in percent) |
|---|---|---|
| (I) | 0.01 | 100 |
| (II) | 0.01 | 100 |

(e) Against oat aphids: Oat plants (*Avena sativa*) which have been strongly infested with oat aphids (*Rhopalosiphum padi*) are watered with the preparation of the active compound so that the preparation penetrates into the soil without wetting the leaves of the oat plants. The active compound is taken up by the oat plants from the soil and thus reached the infested leaves.

After specified periods of time, the degree of destruction is determined.

| Compound | Aqueous concentration (in percent active ingredient/water) | Killing rate (in percent) |
|---|---|---|
| (I) | 0.1 | 100 |
| (II) | 0.1 | 100 |

I claim:
1. A compound of the formula

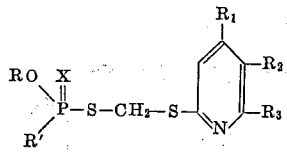

in which
R stands for lower alkyl having up to four carbon atoms,
R' stands for a member selected from the group consisting of lower alkyl up to four carbon atoms and lower alkoxy up to four carbon atoms,
$R_2$ and $R_3$ stand for members selected from the group consisting of hydrogen and a fused benzene nucleus,
$R_1$ stands for a member selected from the group consisting of hydrogen and methyl,
X stands for a member selected from the group consisting of oxygen and sulfur, with the proviso that $R_1$ is methyl if $R_2$ and $R_3$ stand for a fused benzene nucleus.

2. A compound of the formula

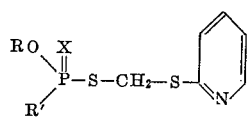

in which
R stands for lower alkyl having up to four carbon atoms,
R' stands for a member selected from the group consisting of lower alkyl up to four carbon atoms and lower alkoxy up to four carbon atoms and
X stands for a member selected from the group consisting of oxygen and sulfur.

3. A compound of the formula

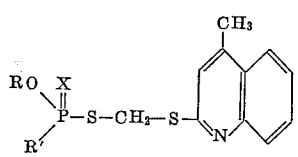

in which
R stands for lower alkyl having up to four carbon atoms,
R' stands for a member selected from the group consisting of lower alkyl up to four carbon atoms and lower alkoxy up to four carbon atoms and
X stands for a member selected from the group consisting of oxygen and sulfur.

4. A compound of the formula

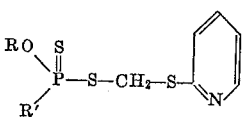

in which
R stands for lower alkyl having up to four carbon atoms,
R' stands for a member selected from the group consisting of lower alkyl up to four carbon atoms and lower alkoxy up to four carbon atoms.

5. The compound of the formula
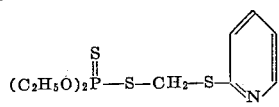
6. The compound of the formula
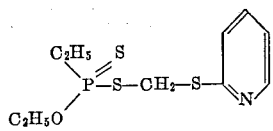
References Cited by the Examiner
UNITED STATES PATENTS
| | | | |
|---|---|---|---|
| 2,706,194 | 4/1955 | Morris et al. | 260—290 X |
| 2,818,366 | 12/1957 | Birum | 167—22 |
| 2,906,661 | 9/1959 | Baker et al. | 167—22 |
| 3,041,367 | 6/1962 | Leber et al. | 260—290 X |
| 3,232,830 | 2/1966 | Schrader et al. | |
ALEX MAZEL, *Primary Examiner.*
HENRY R. JILES, *Examiner.*
DONALD G. DAUS, *Assistant Examiner.*